(12) United States Patent
Fujita et al.

(10) Patent No.: US 6,774,533 B2
(45) Date of Patent: Aug. 10, 2004

(54) ELECTROSTATIC IMPACT DRIVING MICROACTUATOR

(75) Inventors: Hiroyuki Fujita, Tokyo (JP); Dai Kobayashi, Tokyo (JP); Makoto Mita, Tokyo (JP); Shouichi Tensaka, Tokyo (JP)

(73) Assignee: Japan Science and Technology Agency, Kawaguchi (JP)

( * ) Notice: Subject to any disclaimer, the term of this patent is extended or adjusted under 35 U.S.C. 154(b) by 60 days.

(21) Appl. No.: 10/221,151
(22) PCT Filed: Mar. 16, 2001
(86) PCT No.: PCT/JP01/02119
§ 371 (c)(1), (2), (4) Date: Sep. 13, 2002
(87) PCT Pub. No.: WO01/68512
PCT Pub. Date: Sep. 20, 2001

(65) Prior Publication Data
US 2003/0038558 A1 Feb. 27, 2003

(30) Foreign Application Priority Data
Mar. 17, 2000 (JP) .......................................... 2000-077105

(51) Int. Cl.[7] ................................................. H02N 1/00
(52) U.S. Cl. ......................................................... 310/309
(58) Field of Search ........................ 310/309; 73/514.32

(56) References Cited

U.S. PATENT DOCUMENTS 4,894,579 A * 1/1990 Higuchi et al. .............. 310/328

FOREIGN PATENT DOCUMENTS

| EP | 1270506 | * 2/2003 | ............ H02N/1/00 |
|----|---------|----------|----------------------|
| JP | 60-60582 | 4/1985 | |

(List continued on next page.)

OTHER PUBLICATIONS

U–G Electrostatic Impulse Drive, DeHennis and O'Brien, Internet Posting, Oct. 15, 2002.*
Intricate Mechanisms–on–a–chip Enabled by 5–level Surface Micro Machining, Digest of Transducers'99, Sendai, Japan, Jun. 1999, pp. 990–993.
Ultra–precision Positioning Mechanism Utilizing Rapid Deformation of a Piezoelectric Element, Journal of the Society of Precision Engineering, 54–11, 2107, Dec. 1998.

Primary Examiner—Karl Tamai
(74) Attorney, Agent, or Firm—Westerman, Hattori, Daniels & Adrian, LLP

(57) ABSTRACT

An extremely small, self-moved, impact driven microactuator is disclosed that has a movable mass member electrostatically driven and which eliminates the need for it to be assembled individually. The microactuator includes a fixing member (1) securely connected to a pedestal part (14), an elastic support beam member (2) having one end securely connected to the fixing member, a movable mass member (3) fastened to the other end of the elastic support beam member, a driving electrode and a stopper member (4, 5) each securely connected to the pedestal part and spacedly juxtaposed with the movable mass member, and a power supply circuit (9) for applying a voltage between the movable mass and driving electrode members. In operation, turning the power supply circuit ON generates electrostatic attraction between the driving electrode member and movable mass members, thereby bringing the movable member into collision with the stopper member, followed by the transmission of a kinetic energy then produced to the outer frame part, and subsequently turning the power supply circuit OFF removes the electrostatic attraction, thereby permitting the movable mass member to return to its original position under an elastic force exerted by the elastic support beam member, followed by the transmission of a reaction force then produced to outer frame part, whereby the microactuator is bodily moved in a given direction.

16 Claims, 19 Drawing Sheets

FOREIGN PATENT DOCUMENTS

| | | | | | |
|---|---|---|---|---|---|
| JP | 05-137352 | * | 6/1993 | ............ | H02N/1/00 |
| JP | 05-188164 | * | 7/1993 | ............ | F12B/5/00 |
| JP | 6-120581 | | 4/1994 | | |
| JP | 7-143763 | | 6/1995 | | |
| JP | 7-203689 | | 8/1995 | | |
| JP | 8-266073 | | 10/1996 | | |
| JP | 2001-242936 | * | 9/2001 | ............ | H02N/2/00 |

* cited by examiner (a)

(b)

US 6,774,533 B2

ELECTROSTATIC IMPACT DRIVING MICROACTUATOR

TECHNICAL FIELD

The present invention relates to a micro-actuator and in particular to a microactuator using an electrostatic impact driving mechanism, and to a method of making such a microactuator.

BACKGROUND ART

Precision positioning techniques required in carrying out a micromachining or a micro-displacement operation has come to be ranked to take a very important position, and are sought to be higher in precision than ever.

Making good use of micromachining technologies for manufacturing a positioning device allows its bulk production in a batch process, and has an advantage of eliminating the need to assemble each device product individually while yielding products small-sized, at a low cost and with a reduced individual difference. For this reason, recent years have seen extensive researches conducted on various microactuators and microsystems for positioning (see M. Steven Rodger et al, "Intricate Mechanisms-on-a-chip Enabled by 5-Level Surface Micro Machining", Digest of Transducers '99, Sendai, Japan, June 1999, pp. 990–993). Faced with the problem of importance that the force produced is unsatisfactory and that the movable distance is insufficient, however, micro-actuators so far proposed have had a limited extent of their applicability. For example, an impact driving mechanism using a piezoelectric element has been proposed (see Toshiro Higuchi, Masahiro Watanabe, Ken-ichi Watanabe, "Ultra-precision Positioning Mechanism utilizing Rapid Deformation of a Piezoelectric Element", Journal of the Society of Precision Engineering, 54-11, 2107 (1998), which using a frictional force and an piezoelectric element, has both a very small displacement in a nanometer range and a movable distance utmost minimum in principle, but needs to be built up individually and has a limitation in miniaturization.

Further, microactuators so far proposed are poor in reliability measure such as to prevent entry of dust and moisture in air and are thus inferior in environmental reliability.

It is accordingly a first object of the present invention to provide a microactuator that eliminates the need to assemble individually and can be miniaturized much more than ever and, in particular, to provide a self-moved impact driven actuator which with an electrostatically driven, movable mass member in its driving source is high in environmental reliability. It is a second object of the present invention to provide a method of making such a microactuator utilizing a bulk micromachining technique.

DISCLOSURE OF THE INVENTION

In order to achieve the first object mentioned above, there is provided in accordance with the present invention a microactuator with an electrostatic impact driving mechanism, which as set forth in claim 1 in the appended claims comprises: a closed receptacle formed of an outer frame part, a pedestal part and a lid part; an elastic support beam member disposed in the said closed receptacle; a fixing member disposed in the said closed receptacle and securely connecting a first end of the said elastic support beam member to the said pedestal part; a movable mass member disposed in the said closed receptacle and securely connected to a second end of the said elastic support beam member; a driving electrode and a stopper member disposed in the said closed receptacle, each of which is securely connected to the said pedestal part and spacedly juxtaposed with the said movable mass member; and a power supply circuit disposed in the inside or the outside of the said closed receptacle for applying a voltage between the said movable mass and driving electrode members, wherein the microactuator is so operable that turning the said power supply circuit ON generates electrostatic attraction between the said driving electrode and movable mass members, thereby bringing the said movable member into collision with the said stopper member, followed by the transmission of a kinetic energy then produced to the said closed receptacle, and subsequently turning the said power supply circuit OFF removes the said electrostatic attraction, thereby permitting the said movable mass member to return to its original position under an elastic force exerted by the said elastic support beam member, followed by the transmission of a reaction force then produced to the said closed receptacle, whereby an entire body of the said microactuator is moved in a given direction.

The microactuator so constructed with the electrostatic driving mechanism is of a structure that can be built up by an integrated circuit process technology, and which permits the components to be integrated into an identical device, which eliminates the need to fabricate individual components, and which allows the product to be made that is extremely small in size Specifically, the microactuator with the electrostatic impact driving mechanism may as set forth in claim 2 in the appended claims be characterized in that the said first end of the said elastic support beam member is securely connected to a single fixing element constituting the said fixing member, the said movable mass member is securely connected to the said second end of the said elastic support beam member at two places thereon, the said single fixing element is disposed so as to make the said movable mass member capable of rocking over a surface of the said pedestal part, the said driving electrode and stopper members comprise a first and a second driving electrode and a first and a second stopper member, wherein the said first driving electrode and stopper element are each disposed in front of the said movable mass member while the said second driving electrode and stopper elements are each disposed in rear of the said movable mass member, and the said voltage is applied between a said driving electrode and the said movable mass member via the said outer frame part.

In this construction of the microactuator, selecting the first or second drive electrode with which the voltage is applied allows the microactuator to be bodily moved forth or back.

Alternatively, the microactuator with the electrostatic impact driving mechanism may as set forth in claim 3 in the appended claims be characterized in that the said elastic support beam member is capable of elastically supporting the said movable mass member in two axial directions perpendicular to each other, the said elastic support beam member has a pair of first ends securely connected, respectively, to two fixing elements constituting the said fixing member, the said second end of the said elastic support beam member is securely connected at one place to the said movable mass member, the said two fixing elements are arranged so as to make the said movable mass member capable of rocking forth and back and right and left over a surface of the said pedestal part, the said driving electrode and said stopper members comprise a first, a second, a third and a fourth driving electrode and a first, a second, a third and a fourth stopper element, wherein the said first driving electrode and stopper member, the said second driving electrode and stopper member, the said third driving electrode and stopper element and the said fourth driving electrode and stopper element are disposed in front of, in rear of, at a right hand side and at a left hand side, of the said movable mass member, respectively, and the said voltage is applied between a said driving electrode and the said movable mass member via the said outer frame part.

This construction permits the microactuator to be bodily moved two dimensionally in a given plane and to be so moved in any direction as desired.

Alternatively, the microactuator with the electrostatic impact driving mechanism may as set forth in claim 4 in the appended claims be characterized in that the said movable mass member is fan-shaped and securely connected to the said second end of the said elastic support beam member, the said first end of said elastic support beam member is securely connected to the said fixing member, the said fixing member is arranged so as to make the said movable mass member capable of rocking about the said fixing member over a surface of the said pedestal part, the said driving electrode member and the said stopper member are each fan-shaped, and the said voltage is applied between the said driving electrode member and the said movable mass member via the said outer frame part.

In this construction, the microactuator is rotationally driven and may be applied to form a motor or the like.

Alternatively, the microactuator with the electrostatic impact driving mechanism may as set forth in claim 5 in the appended claims be characterized in that the said movable mass member is supported in suspension by the said elastic support beam member which obliquely support it, the said driving electrode member is disposed below the said movable mass member, the said stopper member is disposed in front or in rear of the said movable mass member, and the said voltage is applied between the said driving electrode member and the said movable mass member via the said outer frame part.

This construction of the microactuator utilizing a potential energy of gravity as the additional force provides a driving force larger in magnitude.

Alternatively, the microactuator with the electrostatic impact driving mechanism may as set forth in claim 6 in the appended claims be characterized in that the elastic support beam member has a pair of first ends securely connected, respectively, to two fixing elements constituting the said fixing member, the said second end of the said elastic support member is securely connected at one place thereon to the said movable mass member, the said two fixing elements are arranged so as to make the said movable mass member capable of rocking over a surface of the said pedestal part and are disposed in front and in rear of the said driving electrode and movable mass members, and the said voltage is applied between the said driving electrode member and the said movable mass member via the said outer frame part.

Advantageously, the said two fixing elements may be monolithic with the said outer frame part as set forth in claim 7 in the appended claims This construction of the microactuator in which two fixing elements are used to fasten the elastic support beam member thereto allows the latter to be fixed to the outer frame part with an increased firmness and provides an improved reliability for the microactuator. Also, advantageously the fixing elements here serve as stopper members and are monolithic with the outer frame part. Thus, when the movable mass member comes into collision with the fixing elements (stopper members), electric charges on the movable mass member are advantageously transferred to the fixing elements and then absorbed by the power supply via the outer frame part. Consequently, there is no charge accumulation on the stopper members; hence there ensues a stabilized operation.

Preferably, the microactuator with the electrostatic impact driving mechanism as set forth in claim 8 in the appended claims is characterized in that the said movable mass member is securely connected to a pair of such elastic support beam members as aforesaid, which are in turn securely connected to a pair of such fixing members as aforesaid, respectively.

This construction of the microactuator permits the movable mass member to be supported as well-balanced in a horizontal plane and hence to be rocked stably and smoothly there.

Preferably, the microactuator with the electrostatic impact driving mechanism as set forth in claim 9 in the appended claims is characterized in that the said driving electrode member is split into two driving electrode elements, which are energizable independently of each other.

This construction of the microactuator utilizes a torsion effect of the elastic support beam members and thereby allows the microactuator to be advanced in a selected direction alterable, by applying a voltage only to one of the electrodes selected.

Also, the microactuator with the electrostatic impact driving mechanism may as set forth in claim 10 in the appended claims be characterized in that the said outer frame part is composed of Si single crystal, and the said pedestal and lid parts are composed of a material having a preselected friction coefficient.

Also, the microactuator with the electrostatic impact driving mechanism may as set forth in claim 11 in the appended claims be characterized in that the said material having a preselected friction coefficient is pyrex glass.

Also, the microactuator with the electrostatic impact driving mechanism may as set forth in claim 12 in the appended claims be characterized in that the said outer frame part, the said elastic support beam member, the said movable mass member, the said driving electrode member and the said stopper member are composed of a Si single crystal, and the said pedestal and lid parts are composed of a material having a preselected friction coefficient.

The present invention also provides a linear driving stage, which may a set forth in claim 15 in the appended claims comprise: a fixed platform; a movable platform slidably mounted on the said fixed platform; and a microactuator with an electrostatic impact driving mechanism as set forth in any one of claims 1 to 3 and 5 to 12, the said microactuator being fastened to the aid movable platform.

The present invention also provides a linear X-Y driving stage, which may as set forth in claim 16 in the appended claims comprise: a fixed platform; a first movable platform slidably mounted on the said fixed platform for movement in a first direction; a second movable platform slidably mounted on the said first movable platform for movement in a second direction orthogonal to the said first direction; and a microactuator with an electrostatic impact driving mechanism as set forth in any one of claims 1 to 3 and 5 to 12, the said microactuator being fastened to the said second movable platform.

The present invention also provides a drive unit which as set forth in claim 17 in the appended claims comprises a movable body and a plurality of microactuators using electrostatic impact driving mechanism incorporated therein, each of which is a microactuator as set forth in any one of claims 1 to 3 and 5 to 12.

In order to achieve the second object mentioned above, there is also provided in accordance with the present invention a method of making a microactuator with an electrostatic impact driving mechanism, by monolithically forming from a Si single crystal substrate, an outer frame part, and an elastic support beam, a movable mass, a driving electrode and a stopper member, and forming a pedestal part and a lid part from a material having a preselected friction coefficient, which method as set forth in claim 18 in the appended claims is characterized by comprising the steps of: a) forming the said driving electrode member on a front surface of the said Si single crystal substrate; b) etching the said Si substrate from its back side in order to make the said elastic support beam and movable mass members floating in the air; c) attaching a first member having a preselected friction coefficient to rear surfaces of the said Si substrate; d) etching the said Si substrate from its front side in order to form the said outer frame part, the said elastic support beam, movable mass members, the said driving electrode member and the said stopper member monolithically; e) etching the said Si substrate from its front side in order to make the said elastic support beam and movable mass members floating in the air; and f) attaching a second member having the said preselected friction coefficient to front surfaces of the said Si substrate.

The method of making a microactuator with an electrostatic impact driving mechanism may as set forth in claim 19 in the appended claims be specifically characterized in that etching steps b), d) and e) are carried out each by inductively coupled plasma—reactive etching.

Also, the method of making a microactuator with an electrostatic impact driving mechanism may as set forth in claim 20 in the appended claims be specifically characterized in that steps c) and f) in which a first or second member having the preselected friction coefficient is attached to rear or front surfaces of the Si substrate are carried out each by anodic joining of pyrex glass as the first or second member to said Si substrate.

BRIEF DESCRIPTION OF THE DRAWINGS

The present invention will better be understood from the following detailed description and the drawings attached hereto showing certain illustrative embodiments of the present invention. In this connection, it should be noted that such embodiments illustrated in the accompanying drawings hereof are intended in no way to limit the present invention but to facilitate an explanation and understanding thereof. In the drawings:

FIG. 4 is a view like FIG. 3, showing the state that the power supply circuit in FIG. 3 is turned ON;

BEST MODES FOR CARRYING OUT THE INVENTION

Now, an explanation in detail is given in respect of a first form of embodiment in a microactuator and a method of its manufacture.

Figure 1:
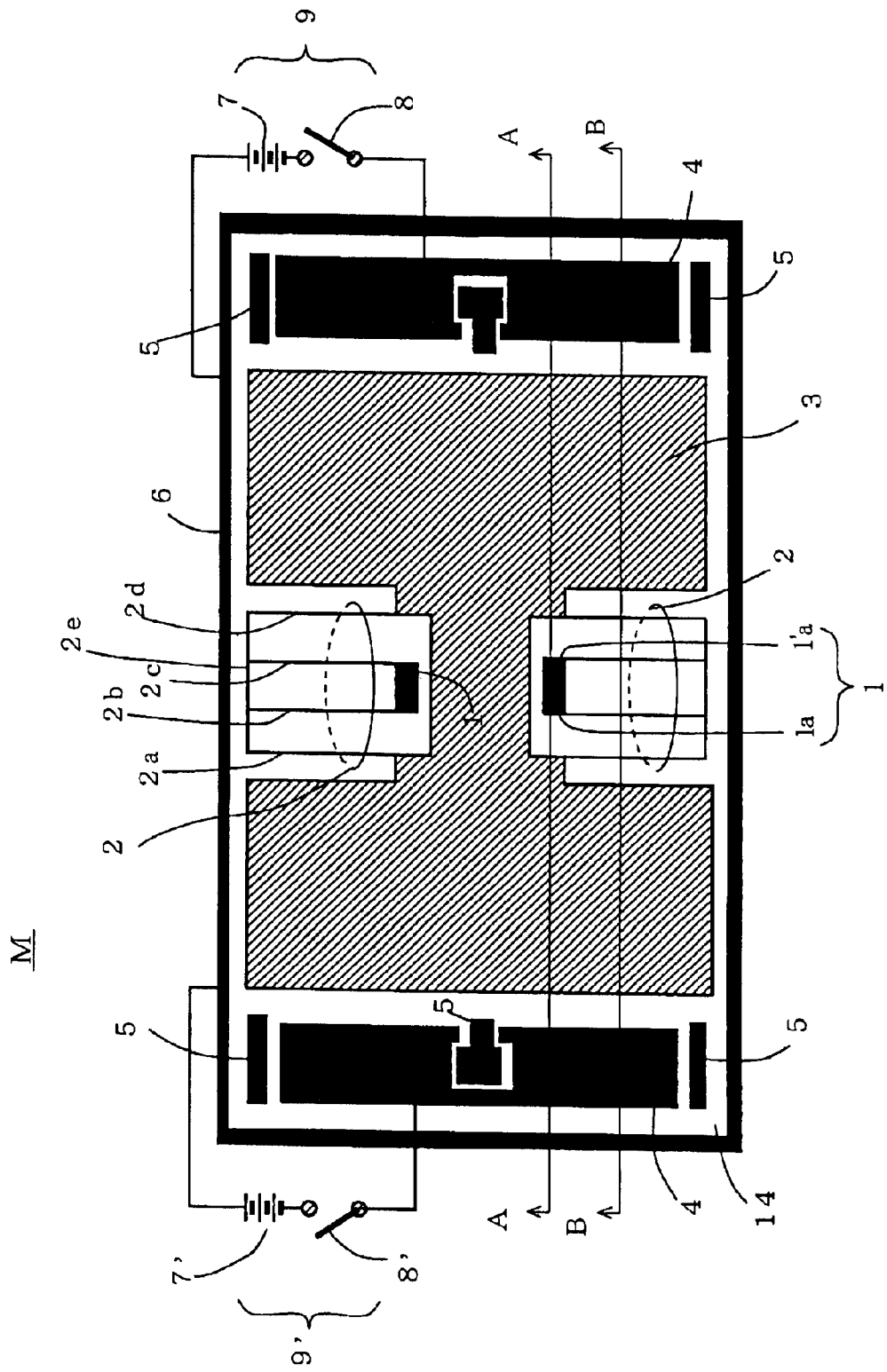
FIG. 1 is a top plan view illustrating the makeup of a microactuator using an electrostatic impact driving mechanism as being a first embodiment of the present invention.
Figure 2:
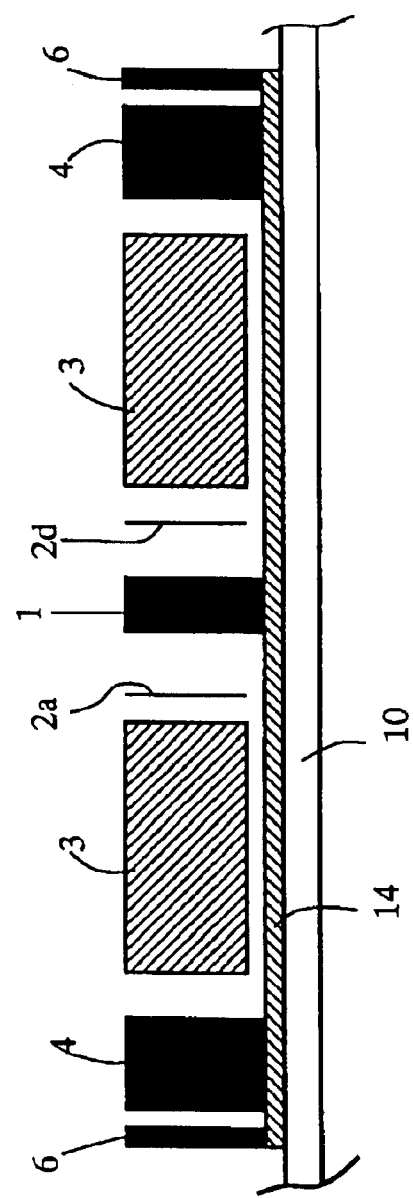
FIG. 2 is a cross sectional view of the microactuator taken along the line A—A in FIG. 1.
Figure 3:
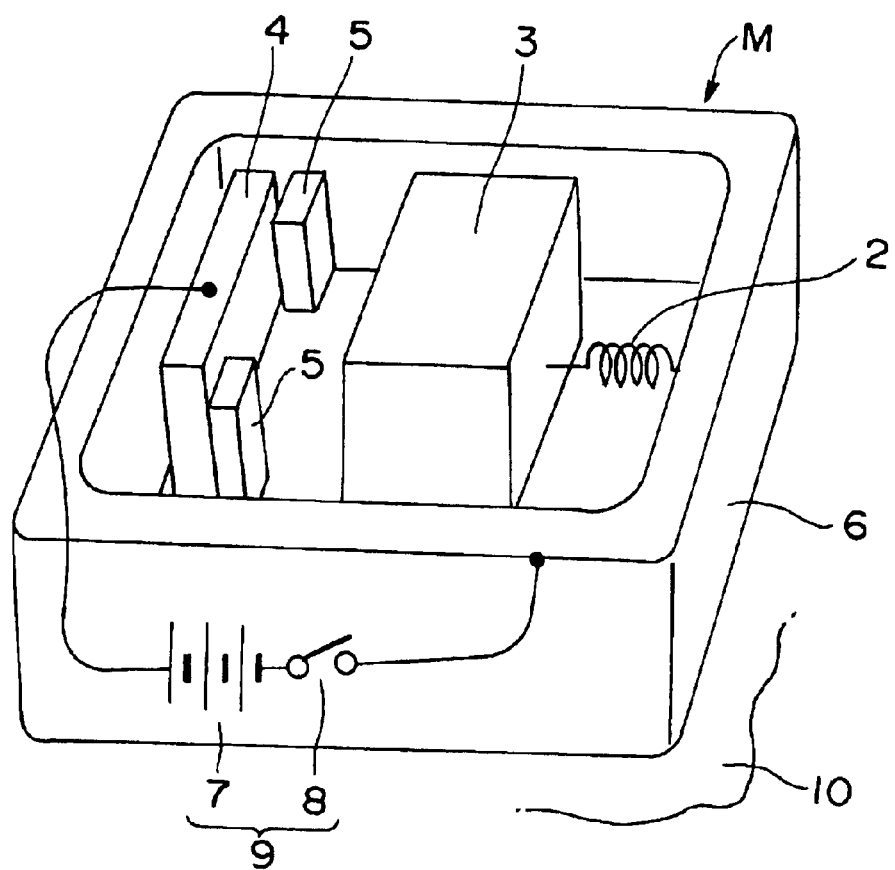
FIG. 3 is a makeup diagrammatic view used to illustrate the principles of operation of the microactuator using an electrostatic impact driving mechanism as being a first embodiment of the present invention.

FIG. 1 is a plan view illustrating the makeup of a microactuator using an electrostatic impact driving mechanism in the first embodiment of the present invention and FIG. 2 is a cross sectional view of the microactuator taken along the line A—A in FIG. 1

It should be noted that FIG. 1 shows the inside makeup of the microactuator and its lid part is omitted from illustration.

This microactuator M using an electrostatic impact driving mechanism is made up of a movable mass member 3 supported by a pair of elastic support beams 2 and a pair of fixing members 1, a pair of (first and a second) driving electrodes 4 disposed in front and in rear of the movable mass member 3, respectively, a pair of (first and second) stopper members 5 disposed at two opposite sides of each electrode 4, and a closed receptacle for hermetically sealing the fixing members 1, the driving electrodes 4, the stopper members 5 and the members mentioned above.

The closed sealing receptacle is made up of an outer frame part 6 formed of a Si single crystal substrate, a pedestal part 14, and a lid part 16.

Further, each of the elastic support beams 2 comprises four thin elastic plates 2a, 2b, 2c and 2d, and a thin elastic plate 2e having one end of each of these thin elastic plates securely connected thereto for supporting these thin elastic plates parallel to one another. The outer thin elastic plates 2a and 2d have their other ends securely connected to the movable mass member 3 while the inner thin elastic plates 2b and 2c have their other ends securely connected to the opposite ends 1a and 1'a of the fixing member 1, respectively.

It should be noted here that the elastic support beams 2 and 2 may be weak in elasticity. Further, a power supply circuit 9 comprising a power supply 7 and a switch 8 is connected between the movable mass member 3 and one of the (first) driving electrodes 4. This power supply circuit 9 may be disposed either outside or inside of the receptacle. Also, another (second) power supply circuit 9' comprising a power supply 7' and a switch 8' is connected between the movable mass member 3 and the other (second) driving electrode 4. And, the entire actuator M is mounted on a platform 10 for self-driving thereon.

Here, the pedestal part 14 and the lid part 16 can be formed, preferably, of pyrex glass.

Mention is next made of the principles of operation of the microactuator using the electrostatic impact driving mechanism in the first embodiment of the invention.

FIGS. 3 to 6 are conceptual views used to illustrate the principles of operation of the microactuator of the present invention. It should be noted here that for the sake of facilitating the illustration, the second electrode 4, the second stopper member 5 and the second power supply 9' are not shown. One end of the power supply circuit 9 is shown connected to the movable mass member 3 via the outer frame 6 and the elastic support beam (spring) 2.

Figure 4:
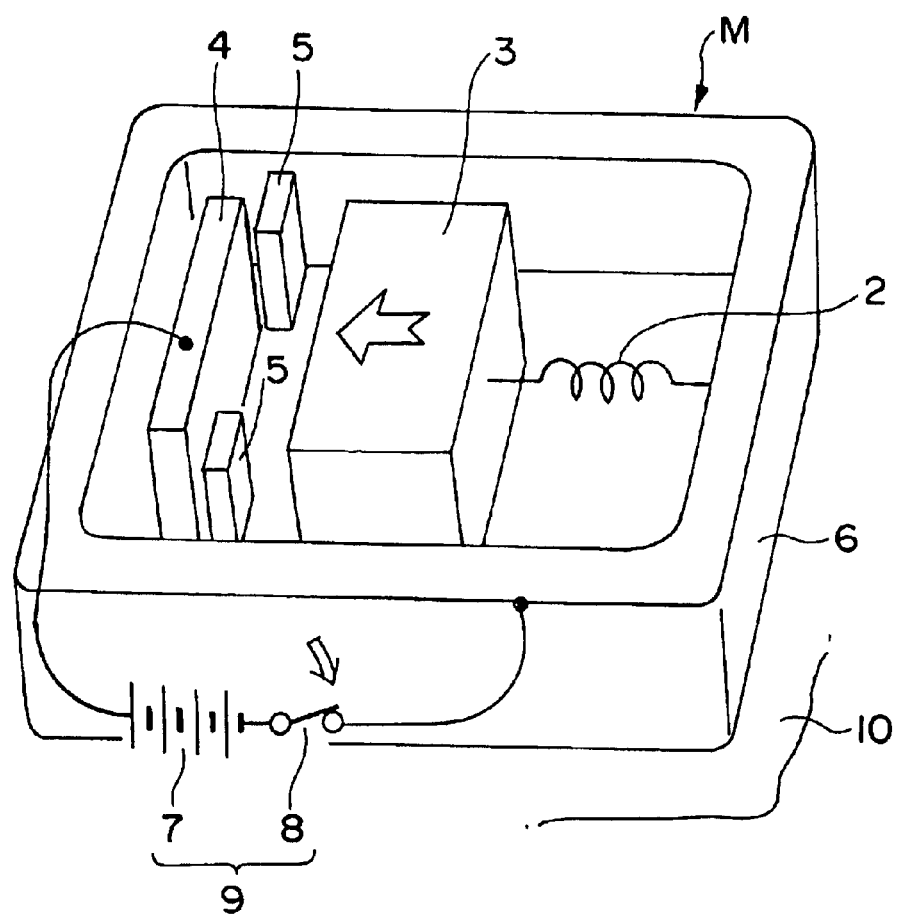
Figure 5:
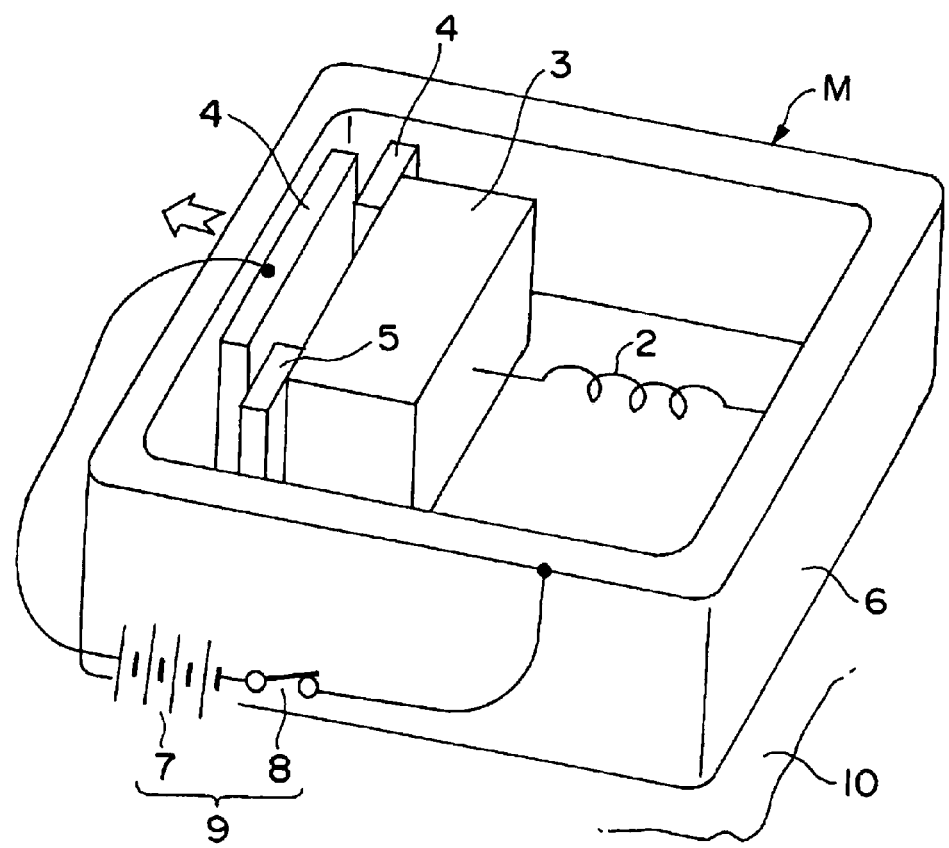
FIG. 5 is a view like FIG. 3, showing the state that the movable mass member in FIG. 3 strikes on the stopper member.

First, the switch 8 of the power supply circuit 9 disposed outside of the outer frame 6 is turned ON, as shown in FIG. 4, to apply a voltage across a spacing between the driving electrode 4 and the movable mass member 3 from the power supply 8. Then, an electrostatic force is generated across the spacing between the movable mass member 3 and the driving electrode 4, thereby causing the movable mass member 3 to begin moving towards the driving electrode 4 and then to be slowly accelerated. It should be noted here that the reaction force generated in the direction opposite to the direction of acceleration, namely the force which the actuator M receives from the platform 10 is set not to exceed the static frictional force between the actuator M and the platform 10.

Then, the movable mass member 3 will continue to be accelerated until it comes into collision with the stopper members 5. Concurrently with the collision, the kinetic energy of the movable mass member 3 is transmitted to the entire body of the actuator M, and the actuator M is bodily moved upon the transmitted energy or force exceeding the static frictional force with the platform 10. And, the actuator M continues to move until the kinetic energy it acquired from the movable mass member 3 is lost by the dynamic frictional force between the actuator M and the platform 10 and then comes to a halt.

Figure 6:
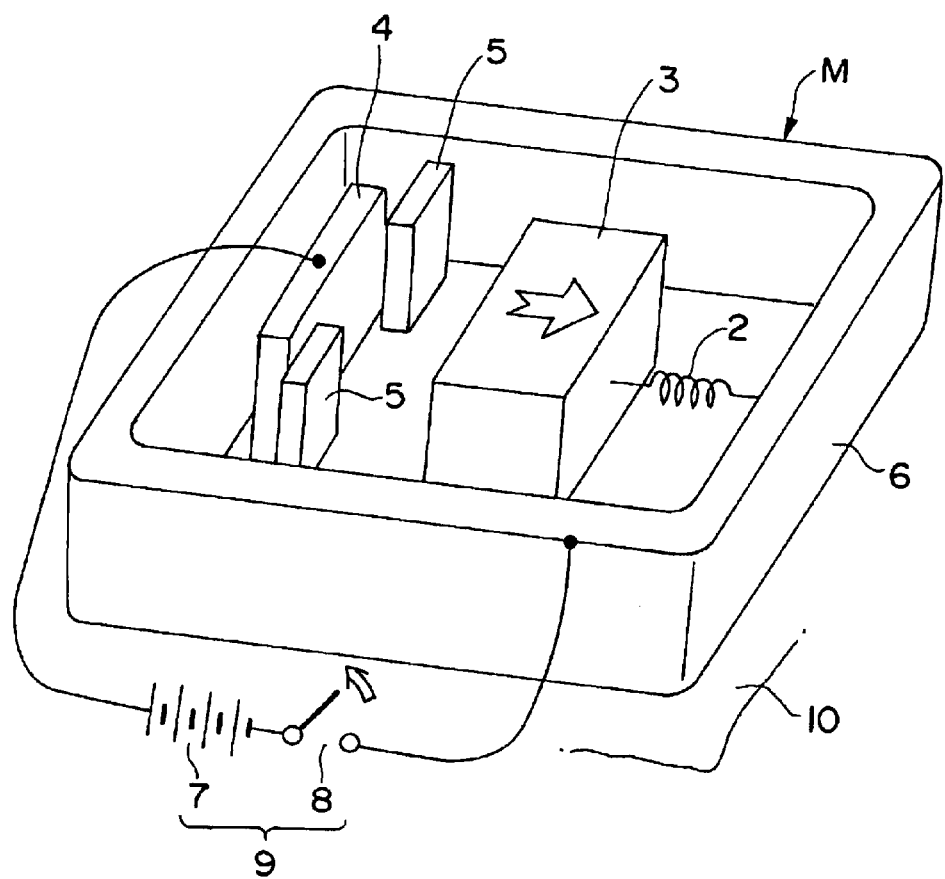
FIG. 6 is a view like FIG. 3, showing the state that the power supply circuit in FIG. 3 is turned OFF.

Referring next to FIG. 6, turning the switch 8 in the power supply circuit 9 OFF to make the applied voltage nil causes the movable mass member 3 to return to its original position under the force exerted by the elastic support beams 2. When the movable mass member 3 so returns, the reaction force then generated, namely the reaction force which the actuator M receives from the platform 10, is directed in the direction of advance of the actuator M and hence contributes to the movement of the actuator M in the direction of its advance. Repeating the cycle mentioned allows the actuator M to be self-moved or -driven in one direction. It is a matter of course that repeating the ON-OFF of the voltage applied across the second driving electrode 4 and the movable mass member 3 from the power supply circuit 9' not shown in FIGS. 3 to 6 allows the movable mass member 3 to be self-moved or -driven in the opposite direction. The power supply circuits 9 and 9' may alternatively be disposed inside of the closed actuator receptacle.

In the above embodiment, adding a mechanism adapted to effect electrostatic or magnetic attraction to the pedestal part 14 or the lid part 16 allows movement on a vertical wall or a ceiling. Further, the friction may be caused to occur between the actuator M and the platform 10 not by the actuator's own weight but by a weight of a bias spring.

Mention is next made of a method of making an actuator of the present invention by taking an example of making a microactuator using the electrostatic impact driving mechanism in the first embodiment thereof.

While this example is shown omitting the stopper members unlike the microactuator makeup shown in FIG. 1, the process of manufacture equally applies to that makeup.

Figure 7:
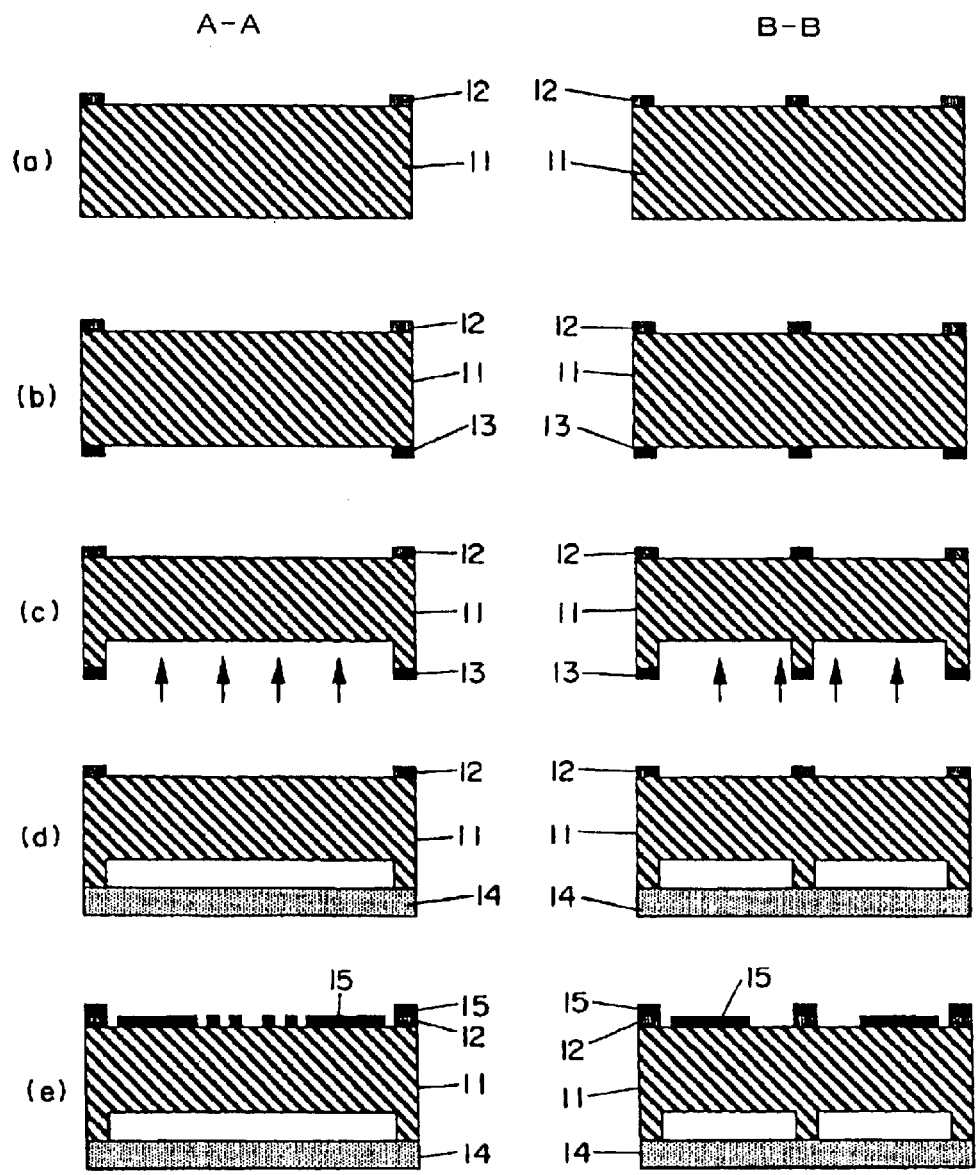
FIG. 7 is a diagram illustrating a microactuator making method (the first half) according to the present invention.

FIG. 7 illustrates the process of manufacturing the first embodiment of the present invention. It should be noted here that in FIG. 7, each of the views shown at the left hand side corresponds to the cross section taken along the line A—A in FIG. 1 and each of the views shown at the right hand side corresponds to the cross section taken along the line B—B in FIG. 1. An actuator being made here has a structure obtained in the manner that in the interest of making the mass of the movable mass member 3 greater, the movable mass member 3 and the fixing member 1 are first micromachined from a Si (silicon) substrate by etching the substrate from the front side surface to the back side surface, and then the fixing member 1 and the driving electrodes 4 are joined to a pyrex glass plate becoming the pedestal part 14.

First, as shown in FIG. 7 at (a) the Si substrate 11, which is high in conductivity and of a thickness of 225 micrometers, has an Al (aluminum) layer 12 built up thereon. Then, by using a first photomask (not shown), patterning is effected of the Al layer 12 for forming an electrode. Next, as shown in FIG. 7 at (b) a resist layer 13 is applied to the back of the substrate, and patterning is effected of the resist layer by using a second photomask (not shown) to bring the movable mass member into the state that it floats in the air. And, in order to bring the movable mass member into the state that it floats in the air, as shown in FIG. 7 at (c) with the resist layer 13 used as the mask the substrate is subjected from its back to a first ICP-RIE (inductively coupled plasma—reactive ion etching step). Those portions of the Si substrate 11 which are becoming the outer frame 6 are then left with the resist thereon and therefore not etched.

Thereafter, as shown in FIG. 7 at (d) the resist layer 13 is removed, and as shown in FIG. 7 at (e) the pyrex glass plate becoming the pedestal part 14 is joined by anodic joining to the Si substrate 11 and resist layers 15 are applied to the surface of the substrate 11 and the Al layer 12, followed by patterning thereof such as to monolithically form the Si substrate 11 portions becoming the outer frame part, the elastic support beams 2 and the movable mass member 3.

Figure 8:
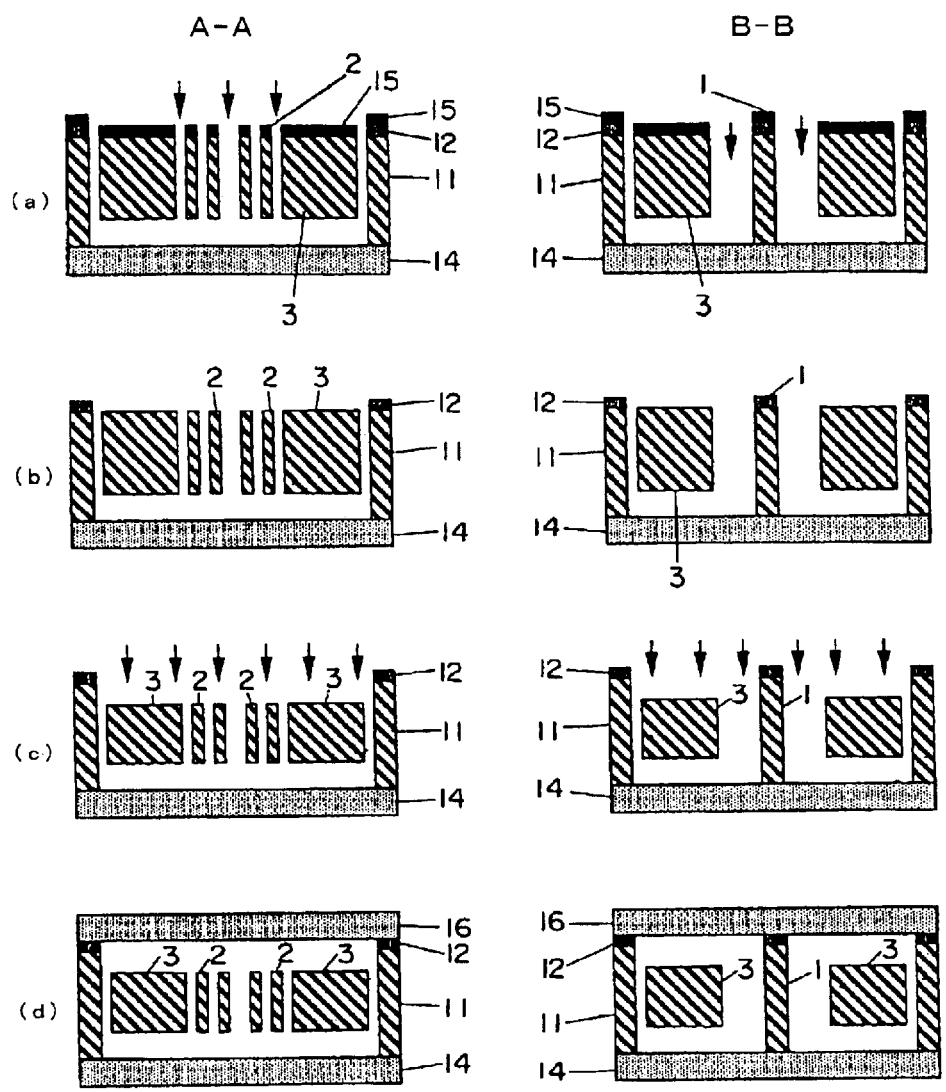
FIG. 8 is a diagram illustrating a microactuator making method (the first half) according to the present invention.

And, as shown in FIG. 8 at (a) by using the patterned resist layers 12 as the masks a second ICP-RIE process step is carried out from the front side. Subsequently, as shown in FIG. 8 at (b) the patterned resists are removed, and as shown in FIG. 8 at (c) a third ICP-RIE process step is performed from the front side to dig the substrate down, thereby forming the elastic support beams 2 and the movable mass member 3 so that they lie out of contact with the lid part 16, namely they lie floating in the air. Those portions of the Si substrate 11 and the fixing member 1 on which Al remain to lie are not etched. Finally, as shown in FIG. 8 at (d) a pyrex glass plate becoming the lid part 16 is joined to the Al layers 12 by anodic joining (a method of joining in which pyrex glass is brought into contact with Si and an elevated electric field is applied between the pyrex glass plate and the Si substrate), or otherwise with an adhesive agent. In this manner, the microactuator using the electrostatic impact driving mechanism is finished up.

It should be noted here that normally a plurality of microactuator units are concurrently fabricated and cut by a dicing saw into chips as individual microactuator products.

The method of manufacture described above uses a highly advanced Si integrated circuit process technology and hence allows mass production of microactuators of a given design and size in a lump with their constituent elements such as the movable mass member, elastic support beams and driving electrodes integrated with precision. Thus, it permits such microactuators to be produced at a reduced cost and with a minimum individual difference.

This method of manufacture also eliminates the need to fabricate and adjust the individual components and permits making them extremely small in size.

Further, this method of manufacture permits a microactuator to be formed in an enclosed structure having its top and bottom formed of pyrex glass and its sides formed of silicon crystal, and hence free from entry of dust and moisture, high in environmental reliability and with an extended service life.

Figure 23:
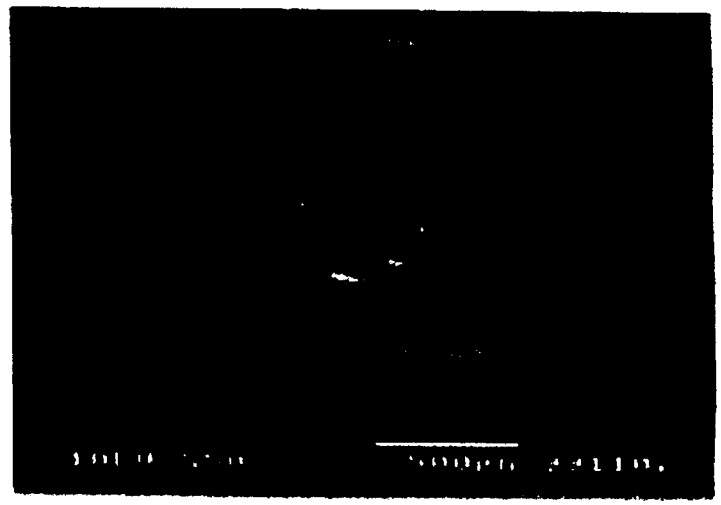
FIG. 23 shows electron microscope photographs of the microactuator using the electrostatic impact driving mechanism in the first embodiment of the present invention.
Figure 23:
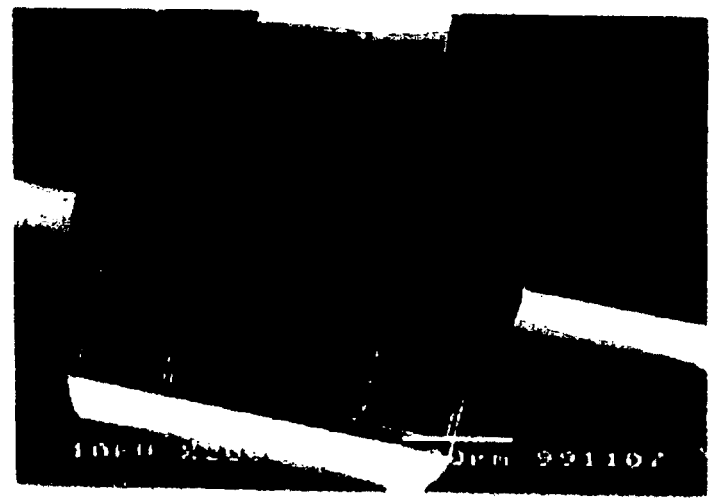

Two microactuators are made by the method of manufacture, one having the elastic support beams of 500 micrometers long and the other having those of 600 micrometers long. These microactuators are shown to have their driving voltages of 70 and 20 volts required to bring the mass member 3 into collision with the stopper members and their resonant frequencies of 368 Hz and 100 Hz, respectively. FIGS. 23A and 23B are the electron microscope photographs of such microactuators used in such measurements.

Mention is next made of a second embodiment of the invention.

Figure 9:
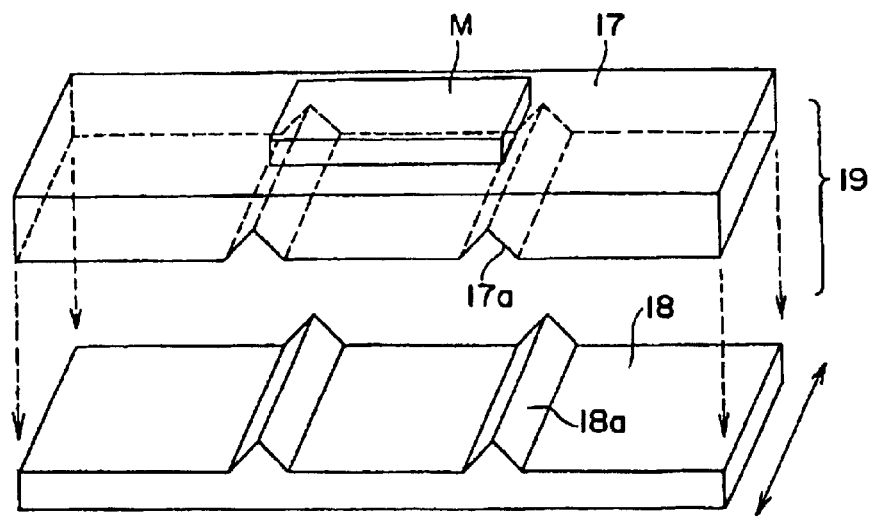
FIG. 9 is a diagram illustrating a second embodiment of the present invention.
Figure 10:
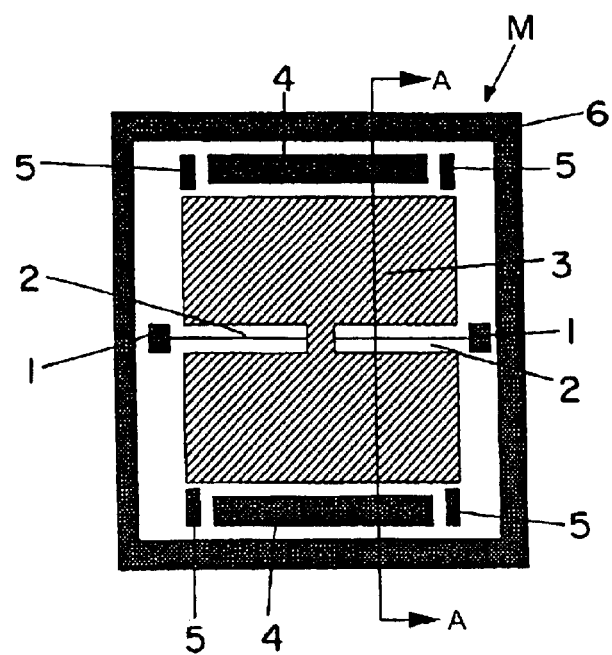
FIG. 10 is a top plan view illustrating the makeup of a microactuator using an electrostatic impact driving mechanism for use in the second embodiment of the present invention.
Figure 11:
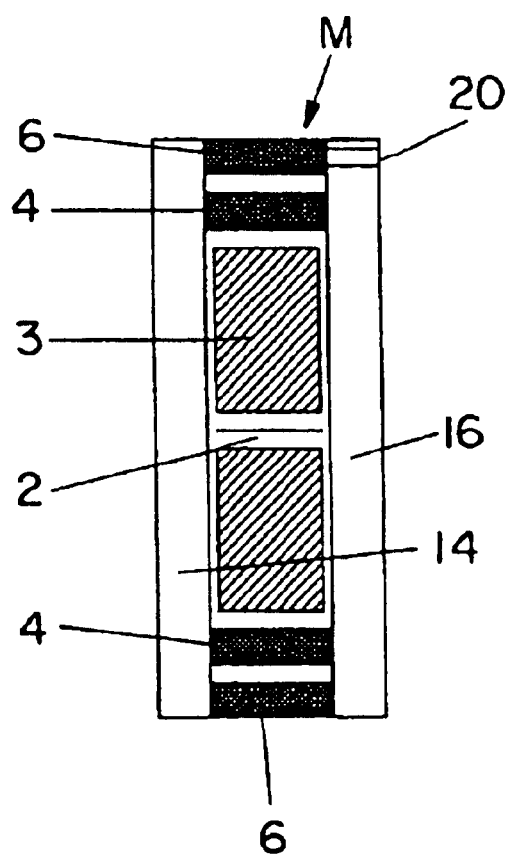
FIG. 11 is a cross sectional view of the microactuator taken along the line A—A in FIG. 10.

FIG. 9 is a decomposed perspective view of the second embodiment of the present invention. A movable platform 17 formed in its lower surface with V-shaped recesses 17a by anisotropic etching is placed on a fixed platform 18 formed in its upper surface with a V-shaped projections 18a by anisotropic etching so that with the V-shaped recesses 17a fitted on the V-shaped projections 18a the upper platform 17 may be slidably moved over the fixed platform, thereby to making up a linear driving stage 19. The movable platform 17 has a one-dimensionally driven impact microactuator M fastened to its upper surface, which enables the movable platform 17 to be moved on the fixed platform 18 in the directions indicated by the arrows. It should be noted here that the actuator M is basically of the structure which as shown in FIG. 10 and in FIG. 11 that is a cross sectional view thereof taken along the line A—A, is the same as in the first embodiment described above; hence its repeated description in detail is omitted. It is shown, however, that the lid part 16 is formed with a through-hole 20 for wiring such that the driving electrodes 4, the fixing member 1 of the movable mass member 3 and the outer frame part 6 may have an voltage applied thereto or may otherwise be grounded.

Mention is next made of a third embodiment of the invention.

Figure 12:
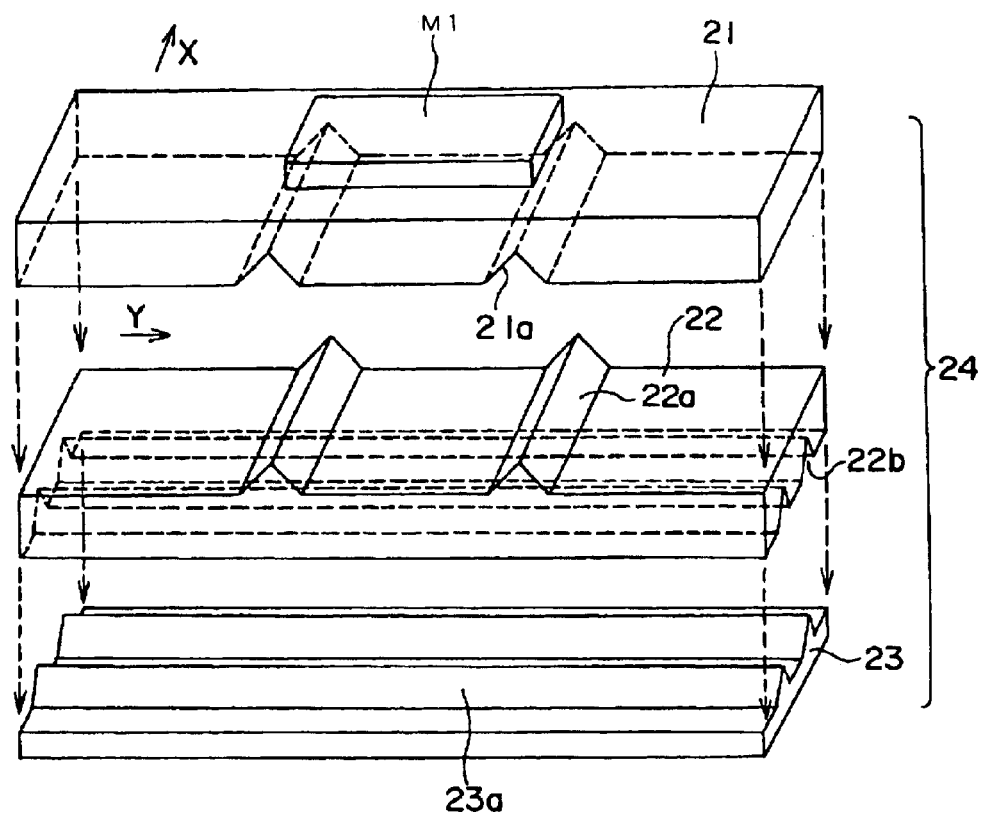
FIG. 12 is a view illustrating a third embodiment of the present invention.

FIG. 12 is a decomposed perspective view showing the third embodiment of the present invention. Here, an X-direction movable platform 21 formed in its lower surface with V-shaped recesses 21a by anisotropic etching, a Y-direction movable platform 22 formed in its upper surface with V-shaped projections 22a and in its lower surface with V-shaped recesses 22b perpendicular thereto by anisotropic etching, and a fixed platform 23 formed in its upper surface with V-shaped projections 23a by anisotropic etching are assembled together so that with the V-shaped recesses 21a fitted with the V-shaped projections 22a and the V-shaped recesses 22b fitted with the V-shaped projections 23a the platform 21 may be slidably moved on the platform 22 and the latter may be slidably moved on the platform 23, thereby making up an XY driving stage 24. The X-direction movable platform 21 has a two-dimensionally driven impact microactuator M1 fastened to its upper surface, which enables the X-direction movable platform 21 to be moved on the Y-direction movable platform 22 in a X-direction indicated by the arrow and the Y-direction movable platform 22 to be moved on the fixed platform 23 in a Y-directions indicated by the arrow.

Figure 13:
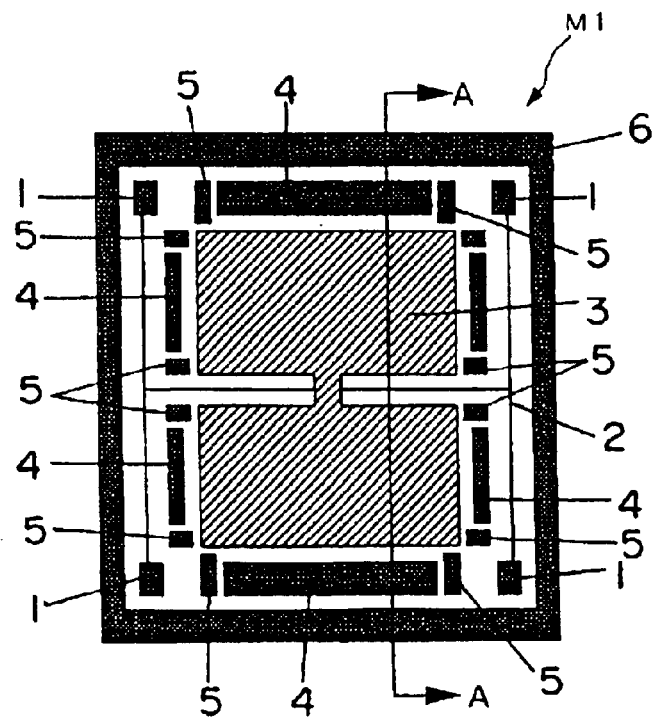
FIG. 13 is a top plan view illustrating the makeup of a microactuator using an electrostatic impact driving mechanism for use in the third embodiment of the present invention.
Figure 14:
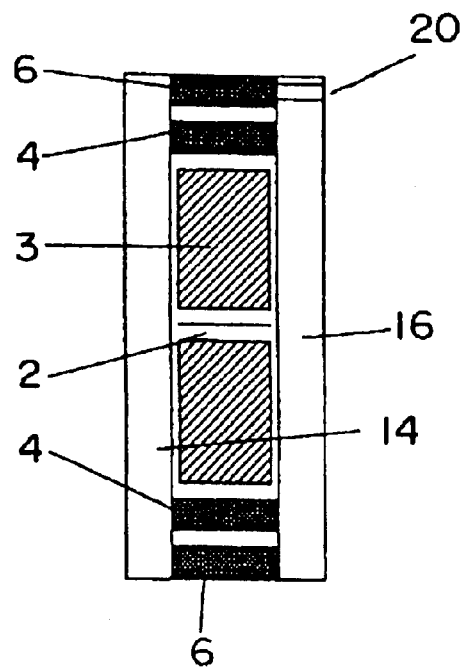
FIG. 14 is a cross sectional view of the microactuator taken along the line A—A in FIG. 13.
Figure 15:
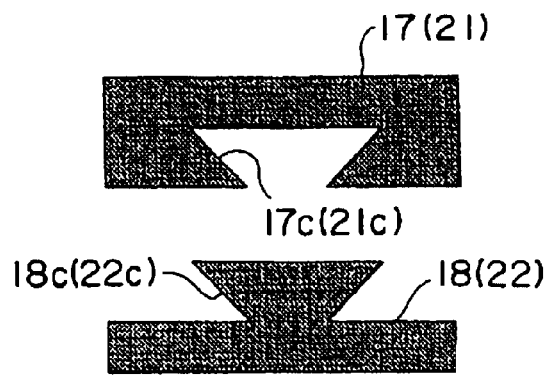
FIG. 15 is a cross sectional view illustrating modified forms of recesses and projections for use in the second and third embodiments of the present invention.

The basic makeup of this actuator M1 is shown in FIG. 13 and in FIG. 14 that is a cross sectional view thereof taken along the line A—A. The microactuator M1 comprises a movable mass member 3 supported by a pair of T-shaped elastic support beams 2 fixed to fixing elements 1 disposed at four corners in the closed receptacle, two pairs of driving electrodes 4 spacedly juxtaposed with the movable mass member 3 at its front and back sides and at its right and left hand sides, respectively, each pair of stopper members 5 disposed at opposite sides of each driving electrode 4, respectively, and an outer frame part 6 made from a Si substrate and having side walls which support and surround therewith the fixing elements 1, the driving electrodes 4 and the stopper members 5. Also, there is connected to each driving electrode 4 and the movable mass member 3, respectively, a power supply circuit such that turning its switch ON and OFF generates a kinetic energy sufficient to move the actuator M1 in the X-, Y-direction. For example, applying a voltage between one of the front and back side driving electrodes 4 and the movable mass member 3 while concurrently removing a voltage between one of the right and left hand side driving electrodes 4 and the movable mass member 3 generates a kinetic energy that moves the actuator M1 diagonally or at an angle. Thus, the actuator M1 is movable by the single device in any direction as desired in a two-dimensional plane. It should be noted further that the lid part 16 (as shown) or the pedestal part 14 is formed with a wiring through-hole 20 such that the driving electrodes 4, fixing members 1 of the movable mass member 3 and side walls of the outer frame part 6 may have an voltage applied thereto or may otherwise be grounded. It should also be noted that in the second and third embodiments mentioned above, the recesses formed in the movable platforms 17, 21 and the projections formed on the fixed platforms 18 (22) may be dovetail grooves 17c (21c) and dovetails 18c (22c), respectively, as shown in FIG. 15.

Figure 16:
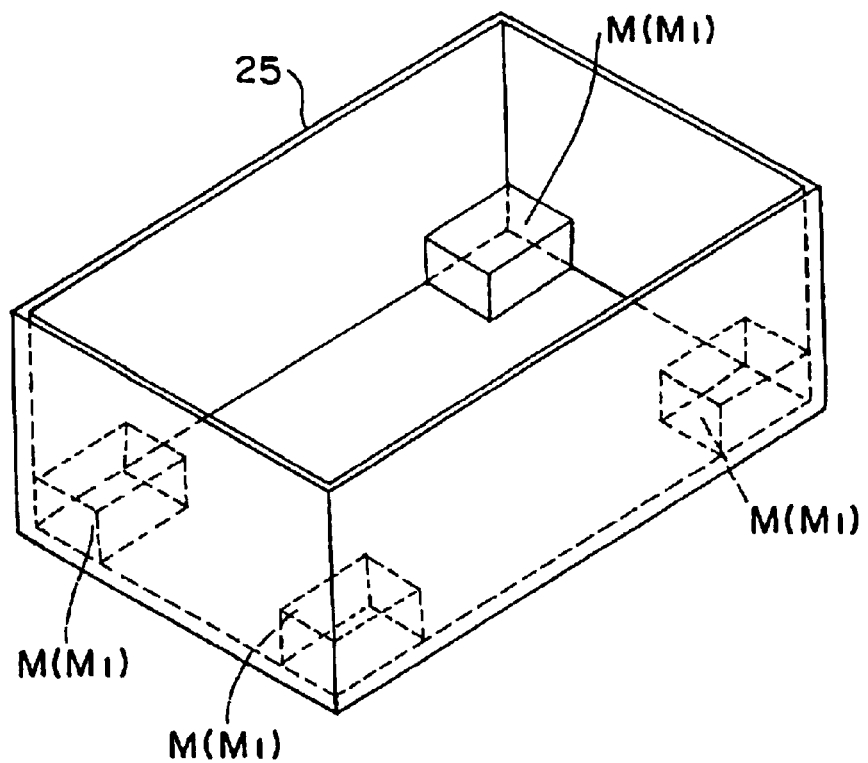
FIG. 16 is a perspective view illustrating a modification of the second and third embodiments.

Also, as shown in FIG. 16 a plurality of actuators M or M1 may be fixed in position in a movable body 25 to provide a drive unit larger in size. Further, incorporating into the movable body 25 a plurality of one-dimensionally movable actuators M with the directions of their movements set three-dimensionally therein makes it movable three-dimensionally. The movable body 25 is also made movable three-dimensionally by incorporating into it a combination of one-dimensional and two-dimensional actuators M and M1. Further, a displacement of a stage as mentioned above is made detectable by integrating a displacement sensor therein, e.g., incorporating a capacitance type sensor in a slide surface or notching such a surface for reading by an optical encoder.

Mention is next made of a fourth embodiment of the invention.

Figure 17:
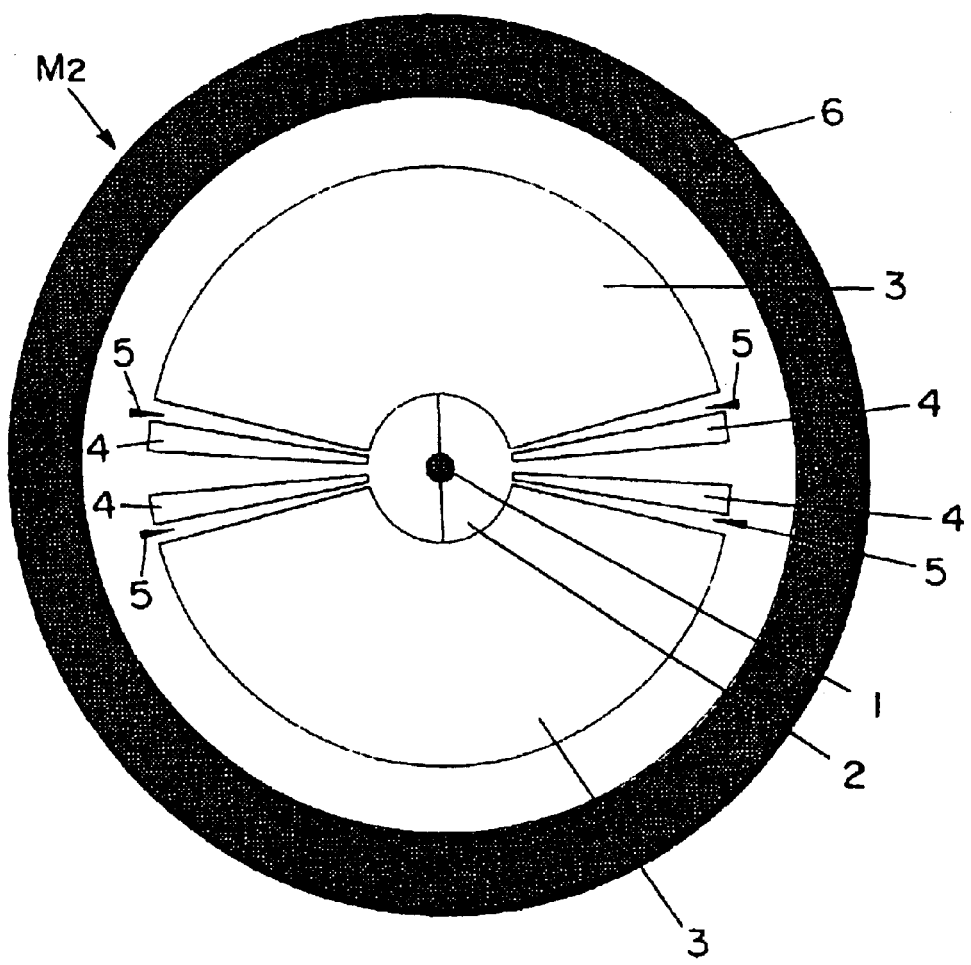
FIG. 17 is a plan view illustrating the makeup of a microactuator using an electrostatic impact driving mechanism in a fourth embodiment of the present invention.

FIG. 17 is a top plan view showing the makeup of a microactuator using a rotationally driven, electrostatic impact driving mechanism in the fourth embodiment of the present invention.

A microactuator M2 using this electrostatic impact driving mechanism comprises a pair of fan-shaped movable mass members 3 supported from a fixing member 1 positioned at the center by elastic support beams 2, respectively, each pair of driving electrodes 4 circumferentially juxtaposed spacedly with each of the movable mass members 3, each stopper member disposed between each driving electrode 4 and each movable mass member 3, and an outer frame part 6 that supports the fixing member 1, the driving electrodes 4 and the stopper members 5 and surrounds therewith the outsides of these members. It should be noted here that the elastic support beams 2 may be weak in elasticity. Further, a power supply circuit not shown is connected across each pair of movable mass members 3 and driving electrode 4, respectively. Also, the entire body of the actuator M2 may pivotally be supported on a platform not shown. And now, turning ON and OFF the switch in each power supply circuit causes the corresponding movable mass member 3 to rotate clockwise or counterclockwise and then to come to collision with the stopper member 5, thereby generating a kinetic energy sufficient to move the actuator M2 clockwise.

Mention is next made of a fifth embodiment of the invention.

Figure 18:
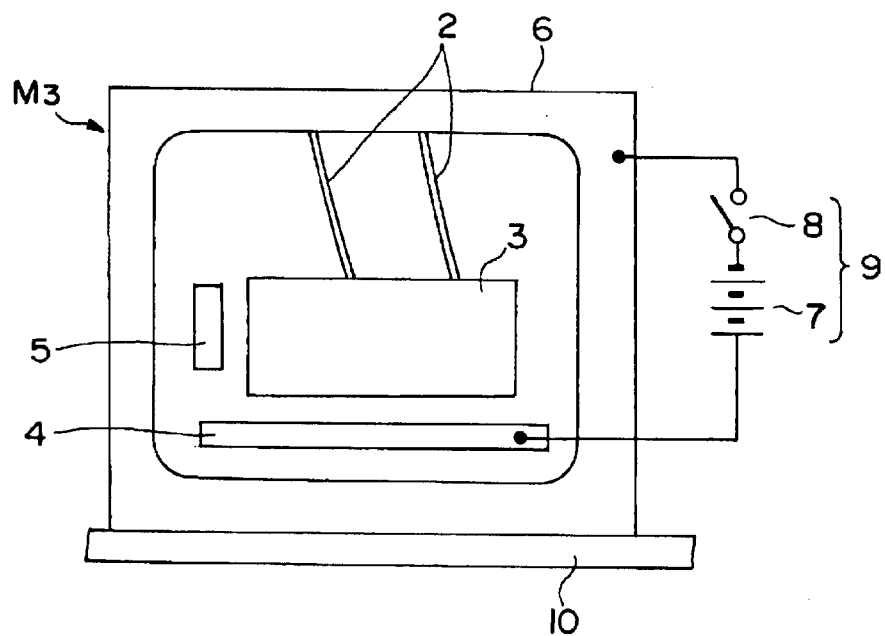
FIG. 18 is a plan view illustrating the makeup of a microactuator using an electrostatic impact driving mechanism in a fifth embodiment of the present invention.

FIG. 18 is a view showing the makeup of a microactuator using a "bell-ringer" or "bell-striker" driving type electrostatic impact driving mechanism.

Figure 19:
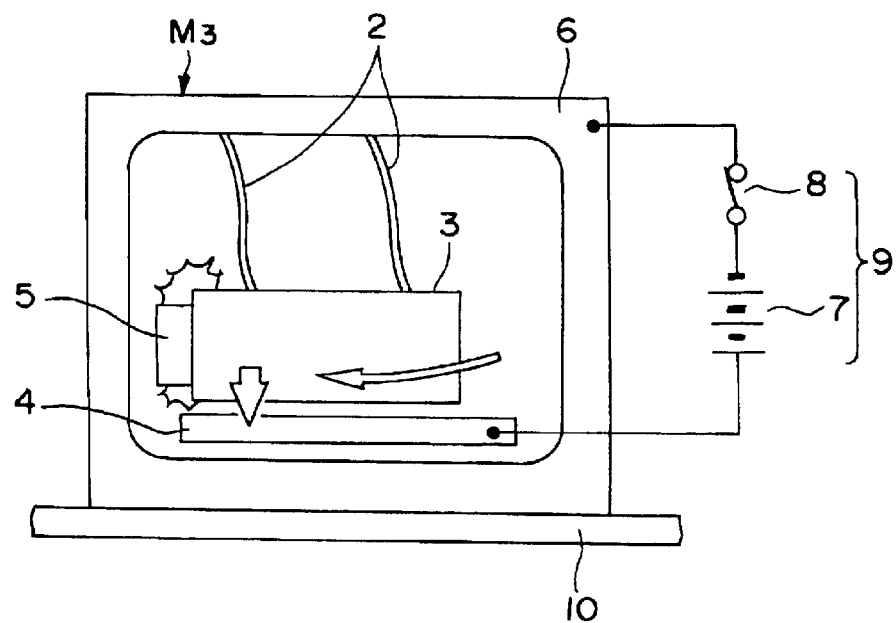
FIG. 19 is a view used to illustrate the principles of operation of the microactuator using an electrostatic impact driving mechanism in the fifth embodiment of the present invention.

A microactuator M 3 using this electrostatic mechanism comprises an outer frame part 6, a movable mass member 3 suspended and thereby supported from the outer frame part 6 with elastic support beams 2 usually made of obliquely parallel springs, a driving electrode 4 disposed below the movable mass member 3 and spacedly juxtaposed therewith, and a stopper member 5 disposed ahead of the movable mass member 3 and spacedly juxtaposed therewith, wherein the elastic support beams 2, the movable mass member 3, the driving electrode 4 and the stopper member 5 are accommodated in the outer frame part 6. It should be noted here that the elastic support beams 2 may be weak in elasticity but should as they are inclined be strong or rigid enough to hold the movable mass member 3 in position. Further, a power supply circuit 9 comprising a power supply 7 and a switch is connected to the driving electrode 4 and to the movable mass member 3 via the outer frame part 6 and the elastic support beams 2. Also, the entire body of the actuator 3 is mounted on a platform 10. And now, turning ON and OFF the switch 8 in the power supply circuit 9 will, as shown in FIG. 19, cause the movable mass member 3 to be attracted towards the driving electrode 4 but a horizontal component of the attraction in this embodiment to move the movable mass member 3 towards the stopper member 5 and thus to bring the former into collision with the latter, thereby producing a kinetic energy sufficient to move the actuator M3 horizontally on the platform 10.

Mention is next made of a sixth embodiment of the invention.

Figure 20:
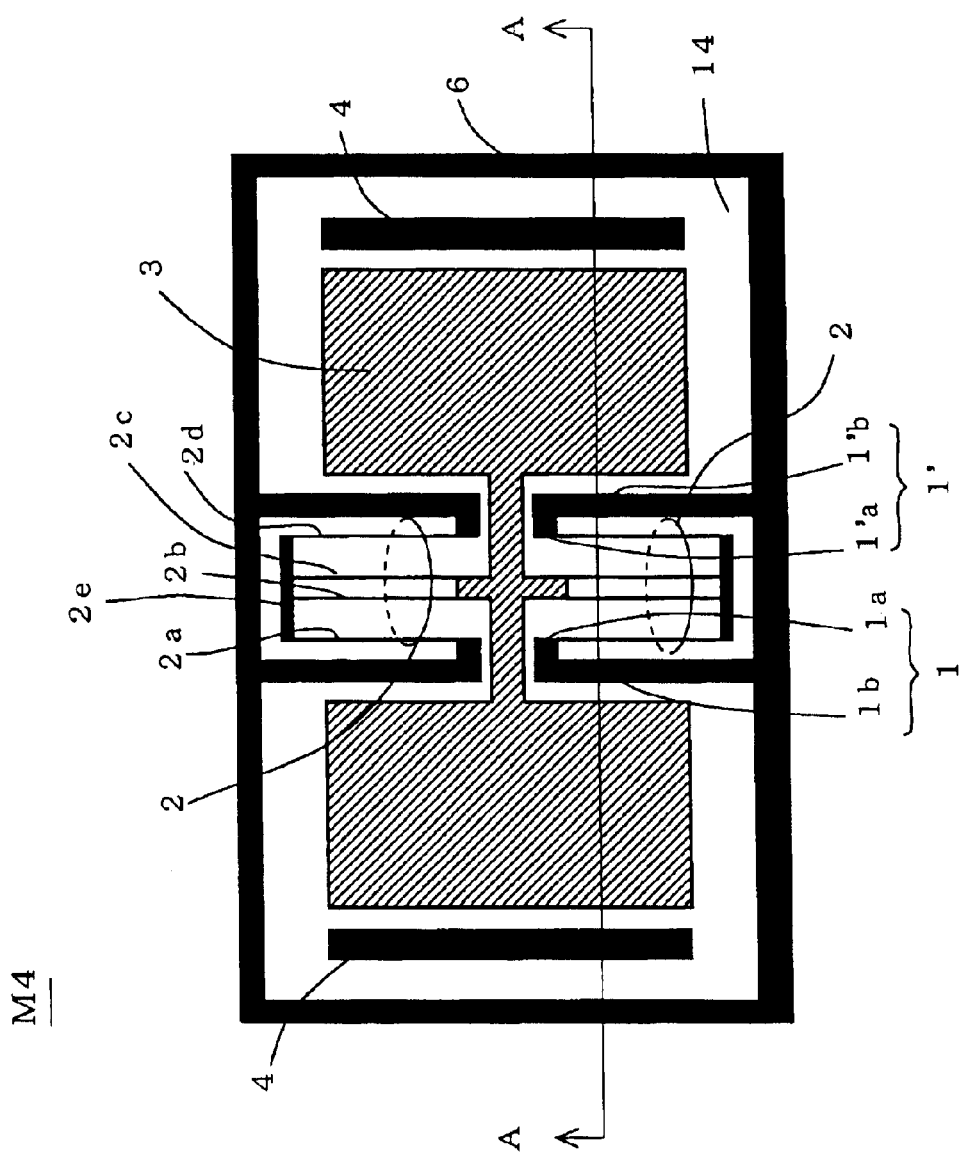
FIG. 20 is a plan view illustrating the makeup of a microactuator using an electrostatic impact driving mechanism in a sixth embodiment of the present invention.
Figure 21:
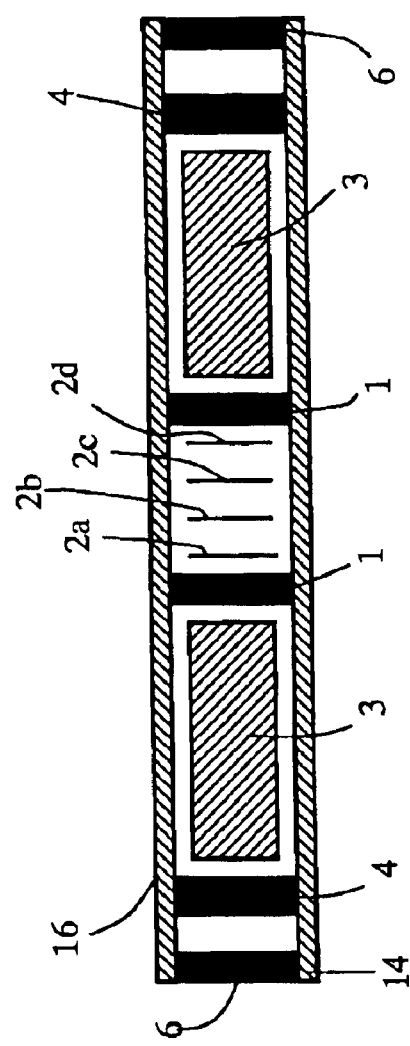
FIG. 21 is a cross sectional view of the microactuator taken along the line A—A in FIG. 21.

FIG. 20 is a top plan view of a one-dimensionally driven microactuator in the sixth embodiment using an electrostatic impact driving mechanism in which a fixing member serves also as a stopper, and FIG. 21 is a cross sectional view of the microactuator taken along the line A—A in FIG. 20.

A microactuator M4 using this electrostatic impact driving mechanism includes a pair of elastic support beams 2. And, each of the elastic support beams 2 comprises four (4) thin elastic plates 2a, 2b, 2c and 2d, and a thin elastic plate 2e having one end of each of these thin elastic plates securely connected thereto for supporting them parallel to one another, wherein of them the outer thin elastic plates 2a and 2d have the other ends are securely connected to fixing ends 1a and 1'a of fixing elements 1 and 1' and the inner thin elastic plates 2b and 2c have the other ends securely connected to a movable mass member 3. The fixing elements 1 and 1' are monolithic with the outer frame part 6, having arms 1b and 1'b extending parallel to sides of the movable mass member 3 and being united to the outer frame part 6. The makeup of this microactuator is otherwise identical to that of the first embodiment.

This makeup having each elastic support beam 2 supported by two fixing elements 1 and 1' provides an increased mechanical strength and an improved reliability for the microactuator. Also, the fixing elements 1 and 1' serve as stopper members. Thus, when the movable mass member 3 comes into collision with the fixing elements (stoppers), electric charges on the movable mass member are advantageously transferred to the fixing elements 1 and 1' and then absorbed by the power supply via the outer frame part. Consequently, there is no charge accumulation on the stopper members; hence there ensues a stabilized operation.

Mention is next made of a seventh embodiment of the invention.

Figure 22:
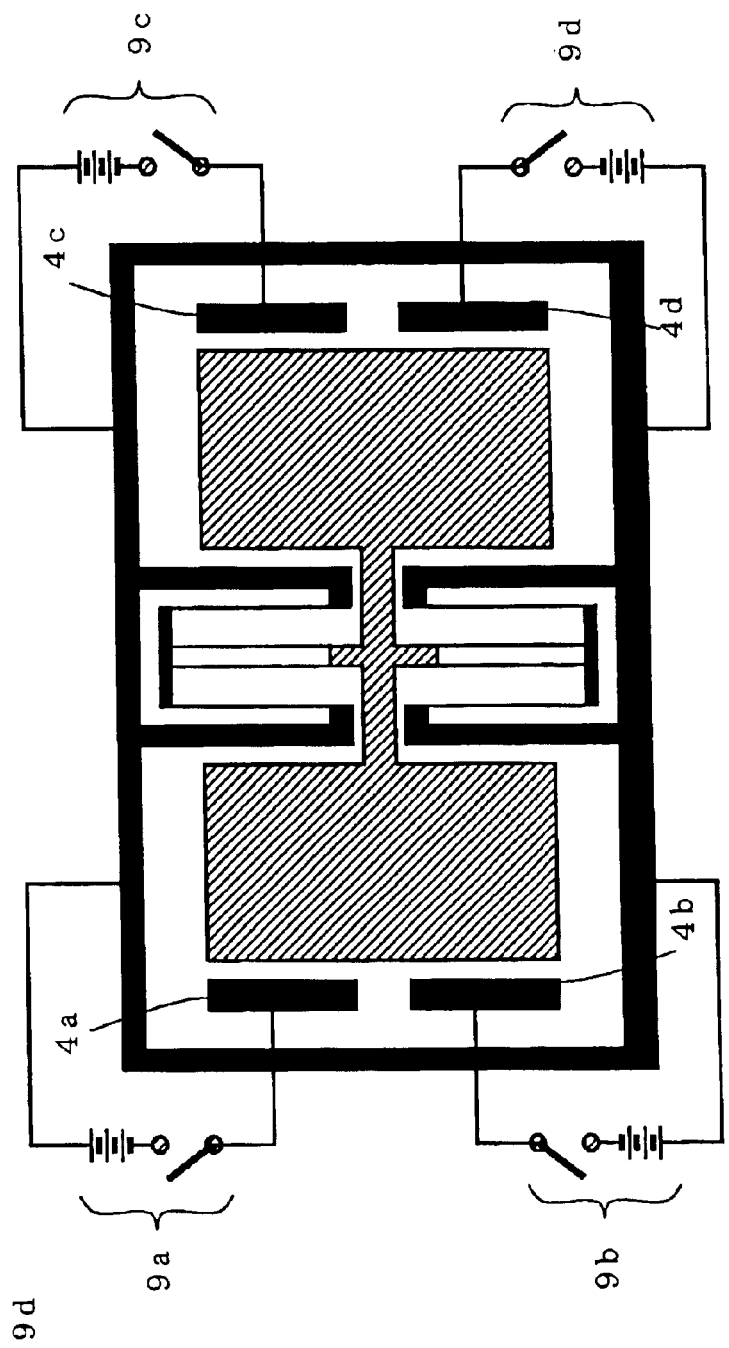
FIG. 22 is a plan view illustrating the makeup of a microactuator using an electrostatic impact driving mechanism in a seventh embodiment of the present invention.

FIG. 22 is a top plan view of a microactuator in the seventh embodiment using an electrostatic impact driving mechanism in which a driving electrode 4 is split.

A microactuator M5 using this electrostatic impact driving mechanism includes four (4) independent power supplies 9a, 9b, 9c and 9d, which are adapted to energize four driving electrodes 4a, 4b, 4c and 4d, respectively, independently of one another. The makeup of this microactuator is otherwise identical to those of the other embodiment.

This makeup utilizes a torsion effect of the elastic support beams and thereby allows the microactuator to be advanced in a selected direction alterable, by energizing one of the electrodes selected.

Although the present invention has hereinbefore been set forth with respect to certain illustrative embodiments thereof, it will readily be appreciated to be obvious to a person skilled in the art that many alterations thereof, omissions therefrom and additions thereto can be made without departing from the essences of scope of the present invention. Accordingly, it should be understood that the invention is not intended to be limited to the specific embodiments thereof set forth above, but to include all possible embodiments that can be made within the scope with respect to the features specifically set forth in the appended claims and to encompass all the equivalents thereof.

Industrial Applicability

As set forth in the foregoing description, in accordance with the present invention there is provided a microactuator that is extremely small in size. Especially, provided in its driving source with a movable mass member adapted to be driven electrostatically, a self-driven impact actuator is obtained that is enhanced in environmental reliability.

The present invention also provides a method of manufacture utilizing a bulk micromachining technique, which permits manufacturing at an extremely high precision and, without the need to assemble individually, at an extremely reduced cost.

What is claimed is:

1. A microactuator using an electrostatic impact driving mechanism, comprising:

a closed receptacle formed of an outer frame part, a pedestal part and a lid part;

an elastic support beam member disposed in said closed receptacle;

a fixing member is disposed in said closed receptacle and securely connecting a first end of said elastic support beam member to said pedestal part;

a movable mass member disposed in said closed receptacle and securely connected to a second end of said elastic support beam member;

a driving electrode and a stopper member disposed in said closed receptacle, each of which is securely connected to said pedestal part and spacedly juxtaposed with said movable mass member; and a power supply circuit disposed in the inside or the outside of said closed receptacle for applying a voltage between said movable mass and driving electrode members, wherein the microactuator is so operable that turning said power supply circuit ON generates electrostatic attraction between said driving electrode and movable mass members, thereby bringing said movable member into collision with said stopper member, followed by the transmission of a kinetic energy then produced to said closed receptacle, and subsequently turning said power supply circuit OFF removes said electrostatic attraction, thereby permitting said movable mass member to return to its original position under an elastic force exerted by said elastic support beam member, followed by the transmission of a reaction force then produced to said closed receptacle, whereby an entire body of said microactuator is moved in a given direction.

2. A microactuator using an electrostatic impact driving mechanism as set forth in claim 1, characterized in that said first end of said elastic support beam member is securely connected to a single fixing element constituting said fixing member, said movable mass member is securely connected to said second end of said elastic support beam member at two places thereon, said single fixing element is disposed so as to make said movable mass member capable of rocking over a surface of said pedestal part, said driving electrode and stopper members comprise a first and a second driving electrode and a first and a second stopper element, wherein said first driving electrode and stopper element are each disposed in front of said movable mass member while said second driving electrode and stopper elements are each disposed in rear of said movable mass member, and said voltage is applied between a said driving electrode and said movable mass member via said outer frame part.

3. A microactuator using an electrostatic impact driving mechanism as set forth in claim 1, characterized in that said elastic support beam member is capable of elastically supporting said movable mass member in two axial directions perpendicular to each other, said elastic support beam member has a pair of first ends securely connected, respectively to two fixing elements constituting said fixing member, said second end of said elastic support beam member is securely connected at one place to said movable mass member, said two fixing elements are arranged so as to make said movable mass member capable rocking forth and back and right and left over a surface of said pedestal part, said driving electrode and said stopper members comprise a first, a second, a third and a fourth driving electrode and a first, a second, a third and a fourth stepper element, wherein said first driving electrode and stopper member, said second driving electrode and stepper member, said third driving electrode and stepper element and said fourth driving electrode and stepper element are disposed in front of, in rear of, at a right hand side and at a left hand side of said movable mass member, respectively, and said voltage is applied between a said driving electrode and said movable mass member via said outer frame part.

4. A microactuator using an electrostatic impact driving mechanism as set forth in claim 1, characterized in that said movable mass member is fan-shaped and securely connected to said second end of said elastic support beam member, said first end of said elastic support beam member is securely connected to said fixing member, said fixing member is arranged so as to make said movable mass member capable of rocking about said fixing member over a surface of said pedestal part, said driving electrode member and said stopper member are each fan-shaped, and said voltage is applied between said driving electrode member and said movable mass member via said outer frame part.

5. A microactuator using an electrostatic impact driving mechanism as set forth in claim 1, characterized in that said movable mass member is supported in suspension by said elastic support beam member which obliquely support it, said driving electrode member is disposed below said movable mass member, said stopper member is disposed in front or in rear of said movable mass member, and said voltage is applied between said driving electrode member and said movable mass member via said outer frame part.

6. A microactuator using an electrostatic impact mechanism as set forth in claim 1, characterized in that said elastic support beam member has a pair of first ends securely connected, respectively, to two fixing elements constituting said fixing member, said second end of said elastic support member is securely connected at one place thereon to said movable mass member, said two fixing elements are arranged so as to make said movable mass member capable of rocking over a surface of said pedestal part and are disposed in front and in rear of said driving electrode and movable mass members, and said voltage is applied between said driving electrode member and said movable mass member via said outer frame part.

7. A microactuator using an electrostatic impact mechanism as set forth in claim 6, characterized in that said two fixing elements are monolithic with said outer frame part.

8. A microactuator using an electrostatic impact mechanism as set forth in any one of claims 1 to 7, characterized in that said movable mass member is securely connected to a pair of such elastic support beam members as aforesaid, which are in turn securely connected to a pair of such fixing members as aforesaid, respectively.

9. A microactuator using an electrostatic impact mechanism as set forth in any one of claims 1 to 7, characterized in that said driving electrode member is split into two driving electrode elements, which are energizable independently of each other.

10. A microactuator using an electrostatic impact mechanism as set forth in any one of claims 1 to 7, characterized in that said outer frame part is composed of Si single crystal, and said pedestal and lid parts are composed of a material having a preselected friction coefficient.

11. A microactuator using an electrostatic impact mechanism as set forth in claim 10, characterized in that said material having a preselected friction coefficient is pyrex glass.

12. A microactuator using an electrostatic impact mechanism as set forth in any one of claims 1 to 7, characterized in that said outer frame part, said elastic support beam member, said movable mass member, said driving electrode member and said stopper member are composed of Si single crystal, and said pedestal and lid parts are composed of a material having a preselected friction coefficient.

13. A linear driving stage, comprising: a fixed platform; a movable platform slidably mounted on said fixed platform; and a microactuator using an electrostatic impact driving mechanism as set forth in any one of claims 1 to 3 and 5 to 7, said microactuator being fastened to said movable platform.

14. A linear X–Y driving stage, comprising: a fixed platform; a first movable platform slidably mounted on said fixed platform for movement in a first direction; a second movable platform slidably mounted on said first movable platform for movement in a second direction orthogonal to said first direction; and a microactuator using an electrostatic impact driving mechanism as set forth in any one of claims 1 to 3 and 5 to 7, said microactuator being fastened to said second movable platform.

15. A drive unit, comprising a movable body and a plurality of microactuators using electrostatic impact driving mechanism incorporated therein, each of which is a microactuator as set forth in any one of claims 1 to 3 and 5 to 7.

16. A microactuator using an electrostatic impact driving mechanism, comprising:

a closed receptacle formed of an outer frame part composed of a Si single crystal, a pedestal part and a lid part;

an elastic support beam member composed of a Si single crystal, disposed in said closed receptacle;

a fixing member composed of a Si single crystal, disposed in said closed receptacle and securely connecting a first end of said elastic support beam member to said pedestal part;

a movable mass member composed of a Si single crystal, disposed in said closed receptacle and securely connected to a second end of said elastic support beam member;

a driving electrode composed of a Si single crystal and a stopper member composed of a Si single crystal, disposed in said close receptacle, each of which is securely connected to said pedestal part and spacedly juxtaposed with said movable mass member; and a power supply circuit disposed in the inside or the outside of said closed receptacle for applying a voltage between said movable mass and driving electrode members;

wherein the microactuator is so operable that turning said power supply circuit ON generates electrostatic attraction between said driving electrode and movable mass members, thereby bringing said movable member into collision with said stopper member, followed by the transmission of a kinetic energy then produced to said closed receptacle and subsequently turning said power supply circuit OFF removes said electrostatic attraction, thereby permitting said movable mass member to return to its original position under an elastic force exerted by said elastic support beam member, followed by the transmission of a reaction force then produced to said closed receptacle, whereby an entire body of said microactuator is moved in a given direction, and said components monolithically fabricated from a Si single crystal make the microactuator to be small, and the reliability to be high.

* * * * *